US006814262B1

(12) United States Patent
Adams et al.

(10) Patent No.: US 6,814,262 B1
(45) Date of Patent: Nov. 9, 2004

(54) DISPOSABLE PUMP AND DRIVE MECHANISM FOR DISPENSING A LIQUID FOOD PRODUCT

(75) Inventors: Mark Adams, Hartland, WI (US); Lisa Allen, Slinger, WI (US); Paul Feldner, Menomonee Falls, WI (US)

(73) Assignee: Server Products, Richfield, WI (US)

( * ) Notice: Subject to any disclaimer, the term of this patent is extended or adjusted under 35 U.S.C. 154(b) by 173 days.

(21) Appl. No.: 10/177,991

(22) Filed: Jun. 21, 2002

(51) Int. Cl.[7] .......................... B65D 37/00; F04B 43/08
(52) U.S. Cl. ................. 222/214; 222/181.1; 222/181.2; 222/325; 222/450; 417/478
(58) Field of Search .......................... 222/181.1, 181.2, 222/181.3, 207, 214, 325, 450, 454, 455; 417/412, 478, 479, 480; 137/852, 859; 141/360–362

(56) References Cited

U.S. PATENT DOCUMENTS

| 3,987,938 A | * | 10/1976 | Cooprider et al. |
| 3,995,774 A | * | 12/1976 | Cooprider et al. |
| 4,349,133 A | * | 9/1982 | Christine ..................... 222/183 |
| 4,515,294 A | * | 5/1985 | Udall |
| 4,603,793 A | * | 8/1986 | Stern |
| 4,722,372 A | * | 2/1988 | Hoffman et al. .............. 141/98 |
| 4,895,276 A | * | 1/1990 | Maldonado .............. 222/144.5 |
| D317,695 S | * | 6/1991 | Stern |
| 5,082,150 A | * | 1/1992 | Steiner et al. ......... 222/189.09 |
| 5,452,826 A | * | 9/1995 | Stern |
| 5,462,203 A | * | 10/1995 | Stern |
| 5,542,574 A | * | 8/1996 | Stern |
| 5,579,959 A | * | 12/1996 | Bennett et al. |
| 5,730,327 A | * | 3/1998 | Stern |
| 5,749,495 A | * | 5/1998 | Stern |
| D418,413 S | * | 1/2000 | Stern |
| 6,016,935 A | * | 1/2000 | Huegerich et al. |
| 6,019,256 A | * | 2/2000 | Seltzer |
| 6,082,584 A | * | 7/2000 | Stern |
| 6,089,406 A | * | 7/2000 | Feldner |
| 6,098,845 A | * | 8/2000 | Stern |
| 6,109,315 A | * | 8/2000 | Stern |

FOREIGN PATENT DOCUMENTS

| EP | 0 097 736 | * | 1/1984 |
| EP | 0 144 879 | * | 11/1984 |

* cited by examiner

Primary Examiner—Timothy L. Maust
(74) Attorney, Agent, or Firm—Andrus, Sceales, Starke & Sawall, LLP

(57) ABSTRACT

An assembly for dispensing liquid food product from a food warmer and dispenser that includes a disposable pump. The disposable pump includes a portioning chamber having a hollow open interior that can receive a supply of food product. The disposable pump includes a one-way inlet valve and a one-way outlet valve to control the flow of food product through the disposable pump. The assembly further includes a compressing device positioned to compress the outer wall of the disposable pump to force food product out of a dispensing portion of the pump. The compressing device includes a pair of actuating arms movable about a pivot point positioned between their inner and outer ends. The inner end of each actuating arm is coupled to a drive member that moves the inner ends of each actuating arm toward and away from each other. As the actuating arms move, the outer ends of the actuating arms compress the disposable pump to dispense food product.

23 Claims, 9 Drawing Sheets

DISPOSABLE PUMP AND DRIVE MECHANISM FOR DISPENSING A LIQUID FOOD PRODUCT

BACKGROUND OF THE INVENTION

The present invention generally relates to a food warmer and dispenser for dispensing a liquid food product, such as but not limited to syrups, fudges for ice cream, condiments, sandwich toppings, cheese and other types of liquid food product. More specifically, the present invention relates to a disposable pump that can be used in cooperation with a flexible product container including the liquid food product such that after the product container has been emptied, the disposable pump can be thrown away with the product container.

Currently available liquid food product dispensers include an open interior that receives a supply of food product. The food product, such as nacho cheese, syrups and toppings for ice cream, is contained within a collapsible container, such as a sealed plastic bag, having a fitment or coupling device. The coupling device receives a corresponding fitting on a pump assembly such that the pump assembly can be used to dispense the liquid food product from the product container.

Typically, a pump assembly has a fitting that mates with the fitting on the flexible container and punctures the food container to dispense the liquid food product. An example of this type of pump is shown in U.S. Pat. No. 5,579,959. Although this pump functions effectively to dispense the food product from the sealed container, at the end of each day the pump must be thoroughly cleaned and sanitized. Thus, the owner of the food warmer and dispenser must spend time washing out and thoroughly cleaning the pump assembly each night.

Alternatively, food warmers and dispensers have been developed that include a peristaltic pump that is used to draw the liquid food product from the product container through a discharge tube. An example of such system is shown in U.S. Pat. No. 6,016,935. Although a peristaltic pump is an effective way of dispensing liquid food product from a product container, the peristaltic pump system suffers from several drawbacks. One such drawback is that the discharge tube connected to the product container is typically formed from silicone. The silicone tube is required to provide adequate strength and resiliency for use with the peristaltic pump. Although a silicone tube functions well in this environment, the silicone tube increases the cost of the product container. Another disadvantage occurs when the peristaltic pump is used with the liquid food product that includes solid food particles having a size similar to the inner diameter of the discharge tube. For example, if the peristaltic pump system is used with nacho cheese including chopped peppers, the chopped peppers can cause the peristaltic pump to create surges of food product as the pepper particles become jammed and subsequently released within the inside of the discharge tube.

Therefore, it is an object of the present invention to provide a combined food product warmer and dispenser that utilizes a simple, effective pump to dispense food product from a collapsible container. It is an additional object of the invention to provide a pump that is disposable such that the pump is utilized with only a single product container and can be disposed of after the product container has been emptied. Further, it is an object of the present invention to provide a drive mechanism that can be used in connection with the disposable. pump to operate the pump and dispense food product. Further, it is an object of the present invention to provide a drive mechanism that can dispense a known volume or variable volume of food product for each activation such that measured amounts of food product can be dispensed. Still further, it is an object of the present invention to provide a drive mechanism that can be easily released to allow the removal and replacement of the pump from within the food warmer and dispenser.

SUMMARY OF THE INVENTION

The present invention is an assembly for dispensing liquid food products from a self-contained flexible container, such as a sealed plastic bag. The dispensing assembly includes a disposable pump that is configured to connect to a coupling device or fitment contained within the flexible container and a compressing device that is mechanically actuated to compress and release the disposable pump to dispense food product from the assembly. The compressing device is controlled by a mechanical drive member such that the assembly dispenses a known amount of food product each time an actuation button is pressed on the dispensing unit.

The disposable pump of the dispensing assembly includes an open portioning chamber that receives food product from the flexible container. The portioning chamber is integrally formed with a dispensing portion of the pump. The dispensing portion receives the food product from the portioning chamber and directs the food product out of a spout for use as desired.

In addition to the portioning chamber and the dispensing portion, the disposable pump includes an attachment portion that is attachable to the portioning chamber. The attachment portion includes an attachment fitting having an open interior that is in communication with the open interior of the portioning chamber. Thus, the food product can flow into the attachment portion and the open interior of the portioning chamber from the flexible product container. The disposable pump includes a pair of locking fingers that engage the coupling device of the flexible container to secure the disposable pump to the packaging container.

The disposable pump further includes an inlet valve positioned between the attachment portion and the portioning chamber. The inlet valve allows food product to flow in only one direction as the pump is used to dispense food product. The inlet valve includes an outer sealing ring and a deflectable flap attached to the sealing ring. The deflectable flap contacts a seat formed between the attachment portion and the portioning chamber to restrict the upward movement of the flap and thus prevent the flow of food product from the portioning chamber into the attachment portion. The inlet valve is press fit into the disposable pump.

The disposable pump further includes an outlet valve positioned between the portioning chamber and the dispensing portion to prevent movement of food product back into the portioning chamber from the dispensing portion. The outlet valve is formed from a combination of a flex washer and a cone washer. The cone washer includes an outer ring and center plug. The center plug is supported by a series of bridges to provide access openings for the flow of food product between the center plug and the outer ring. The center plug is sized to be received within a center opening of the flex washer such that the flex washer allows food product to flow in only one direction.

The entire disposable pump is designed to be attached to the flexible product container and disposed of along with the flexible product container once the product container has been emptied. The design and construction of the disposable pump reduces the costs of the pump and allows the pump to be disposed of as desired.

The compressing device in the preferred embodiment of the invention includes a pair of actuating arms that each extend between an inner end and an outer end. The actuating arms are each pivotally mounted to a support bracket such that the outer ends of the actuating arms are positioned on opposite sides of the disposable pump. The inner ends of the actuating arms are received within a drive track formed on a rotating cam plate.

The rotating cam plate is configured such that as the cam plate rotates, the drive track causes the inner ends of the actuating arms to move toward and away from each other. The movement of the actuating arms toward and away from each other results in movement of the outer ends toward and away from each to compress the disposable pump.

In the preferred embodiment of the invention, the compressing device, and specifically the cam plate, are connected to an electric drive motor. The electric drive motor is actuated by depressing the actuation button on the face of the food warmer and dispenser or a paddle beneath the front face. Upon depression of the actuation button or paddle, the electric drive motor compresses the disposable pump to dispense a known volume of food product and subsequently releases the disposable pump to refill the pump with food product.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
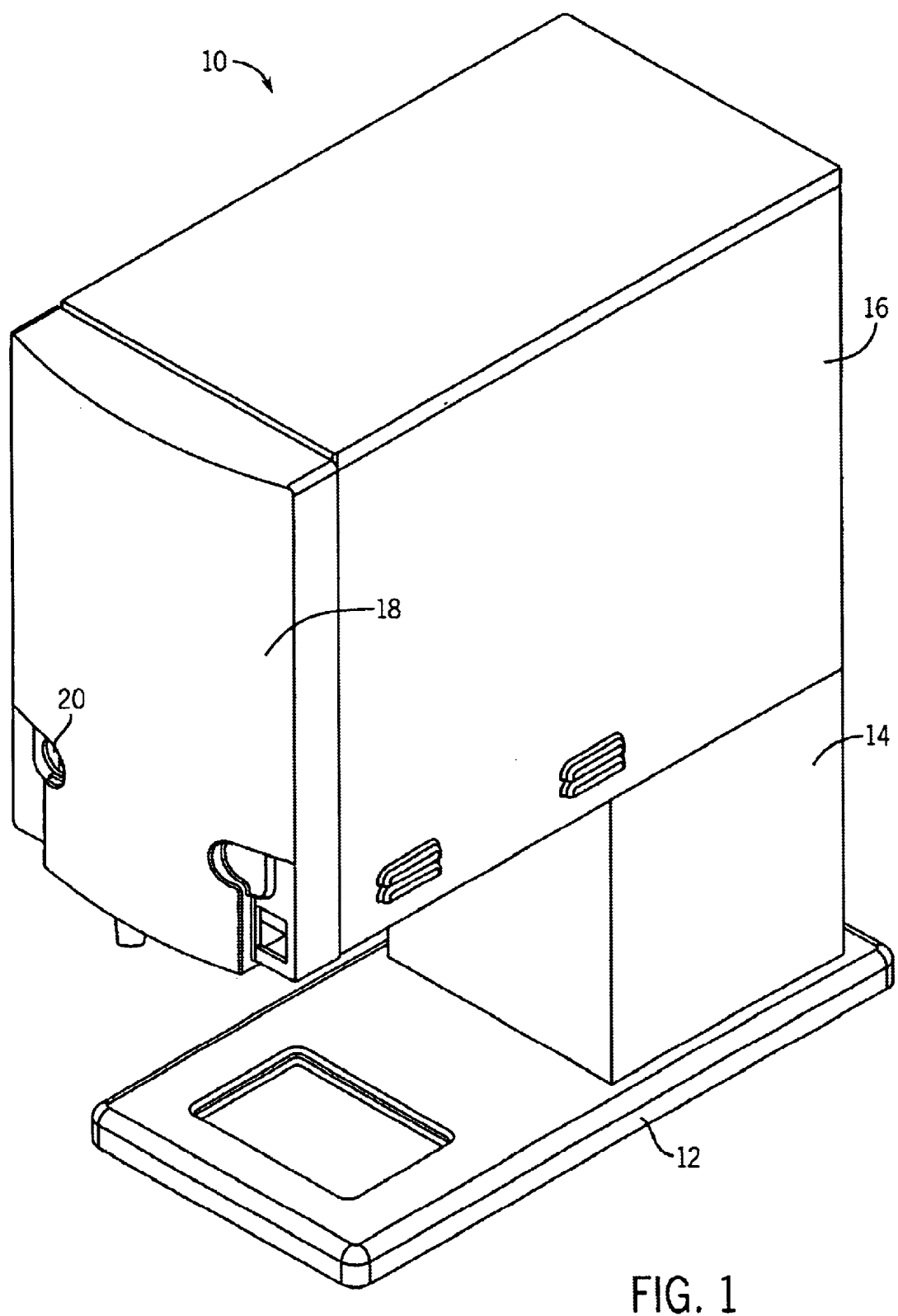
FIG. 1 is a perspective view illustrating a packaged food warmer and dispenser incorporating the disposable pump and drive mechanism of the present invention.

A food warmer and dispenser 10 of the present invention is shown in FIG. 1. The food warmer and dispenser 10 can be used to heat and dispense a liquid food product, such as syrups, fudges for ice cream, cheese products and other similar types of liquid, liquid foods. Preferably, the food warmer and dispenser 10 of the present invention heats and dispenses liquid food product that is contained within a collapsible container, such as a vacuum sealed plastic bag.

The food warmer and dispenser 10 generally includes a base 12 that can be positioned on a support surface, such as a counter in a food service facility. The base 12 includes a pedestal 14 that supports an upper enclosure 16 having a front face plate 18. The upper enclosure 16 defines an open interior that receives the supply of food product to be dispensed. Additionally, the upper enclosure 16 includes a heating unit that maintains the temperature of the food product to be dispensed at a desired, elevated value. Additionally, the enclosure 16 includes the dispensing and portioning assembly of the present invention, as will be described in greater detail below.

The face plate 18 is typically configured to include a graphic image representing the type of material to be dispensed from the food warmer and dispenser 10. The face plate includes an actuation button 20 that can be depressed to dispense a metered quantity of food product, as will be described in greater detail below. In the preferred embodiment of the invention, the face plate 18 is formed from a plastic material, while the upper enclosure 16 and pedestal 14 are formed from a metallic material that can be easily cleaned.

Figure 2:
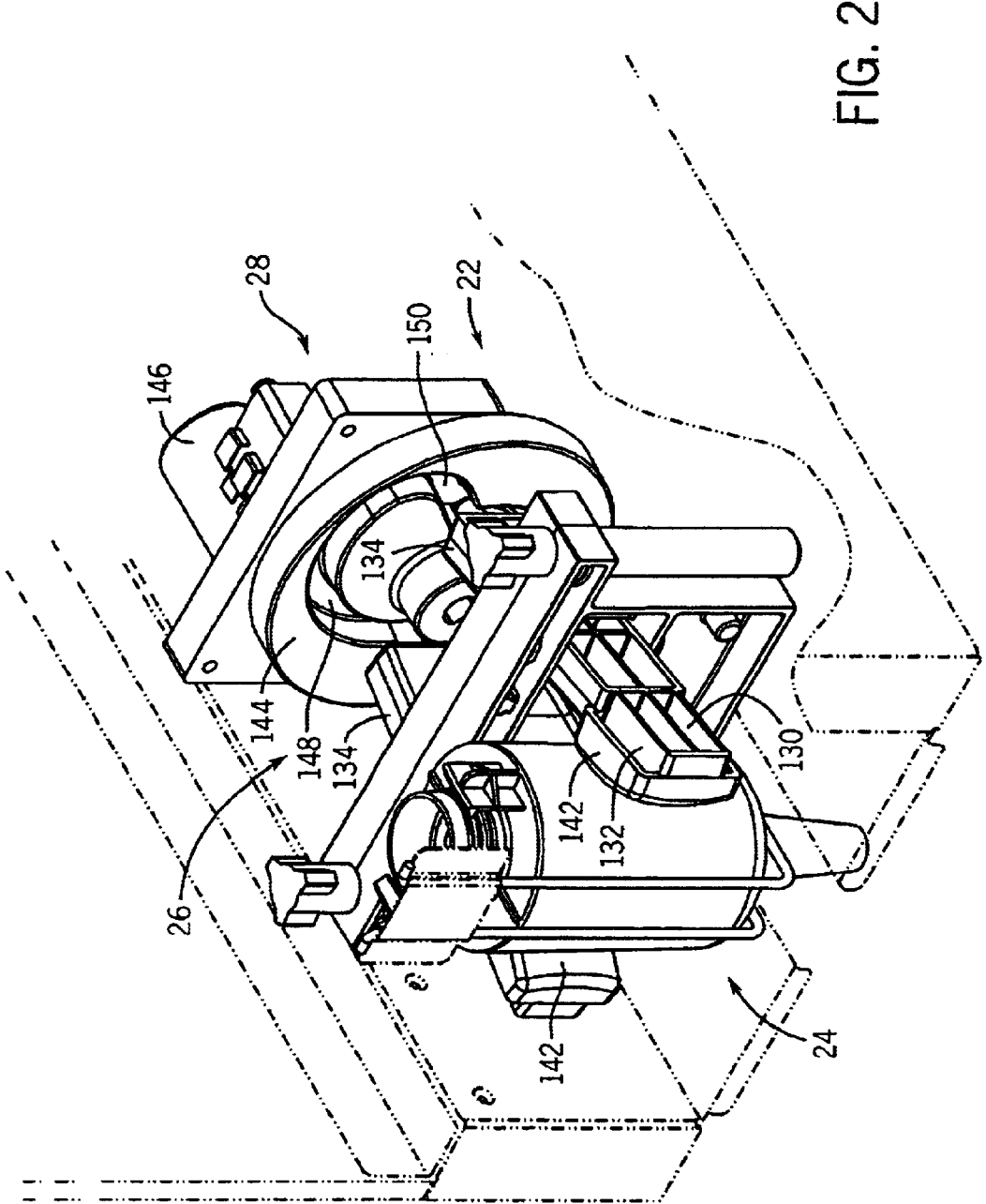
FIG. 2 is a perspective view illustrating a disposable pump and drive mechanism for use in dispensing a liquid food product from a flexible container.

Referring now to FIG. 2, thereshown is the dispensing assembly 22 that is positioned within the food warmer and dispenser 10 and is operable to dispense a metered amount of food product from a collapsible product container. The dispensing assembly 22 generally includes a disposable pump 24 and means 26 for compressing the disposable pump 24 to dispense food product from the pump 24. The means for compressing the disposable pump 24 are coupled to drive means 28 that is operable to apply force to the disposable pump 24 to squeeze food product from the disposable pump 24.

FIGS. 8–11 depict the construction of the disposable pump 24. The disposable pump 24 has been designed such that it is a single use item that is attached to a collapsible container of food product, such as a plastic bag, and is disposed of once the container of food product has been completely dispensed by the food warmer and dispenser 10. The disposable nature of the pump 24 allows the pump 24 to be disposed of after use and eliminates the step of cleaning the pump assembly in a food warmer and dispenser 10.

Figure 8:
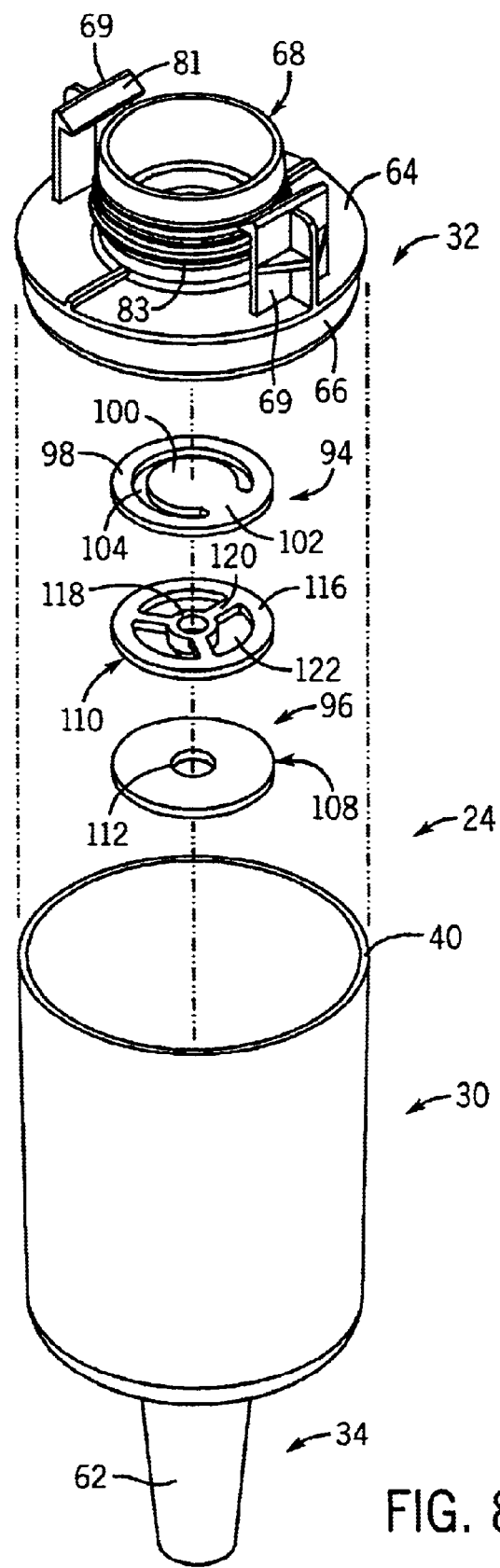
FIG. 8 is an exploded perspective view illustrating the configuration of the disposable pump of the present invention.

As illustrated in FIG. 8, the disposable pump 24 generally includes a portioning chamber 30, an upper attachment portion 32 and a dispensing portion 34. In the preferred embodiment of the invention, the portioning chamber 30 and the dispensing portion 34 are formed as a single unit, while the attachment portion 32 is a separately constructed section that is later attached to the portioning chamber 30.

Figure 9:
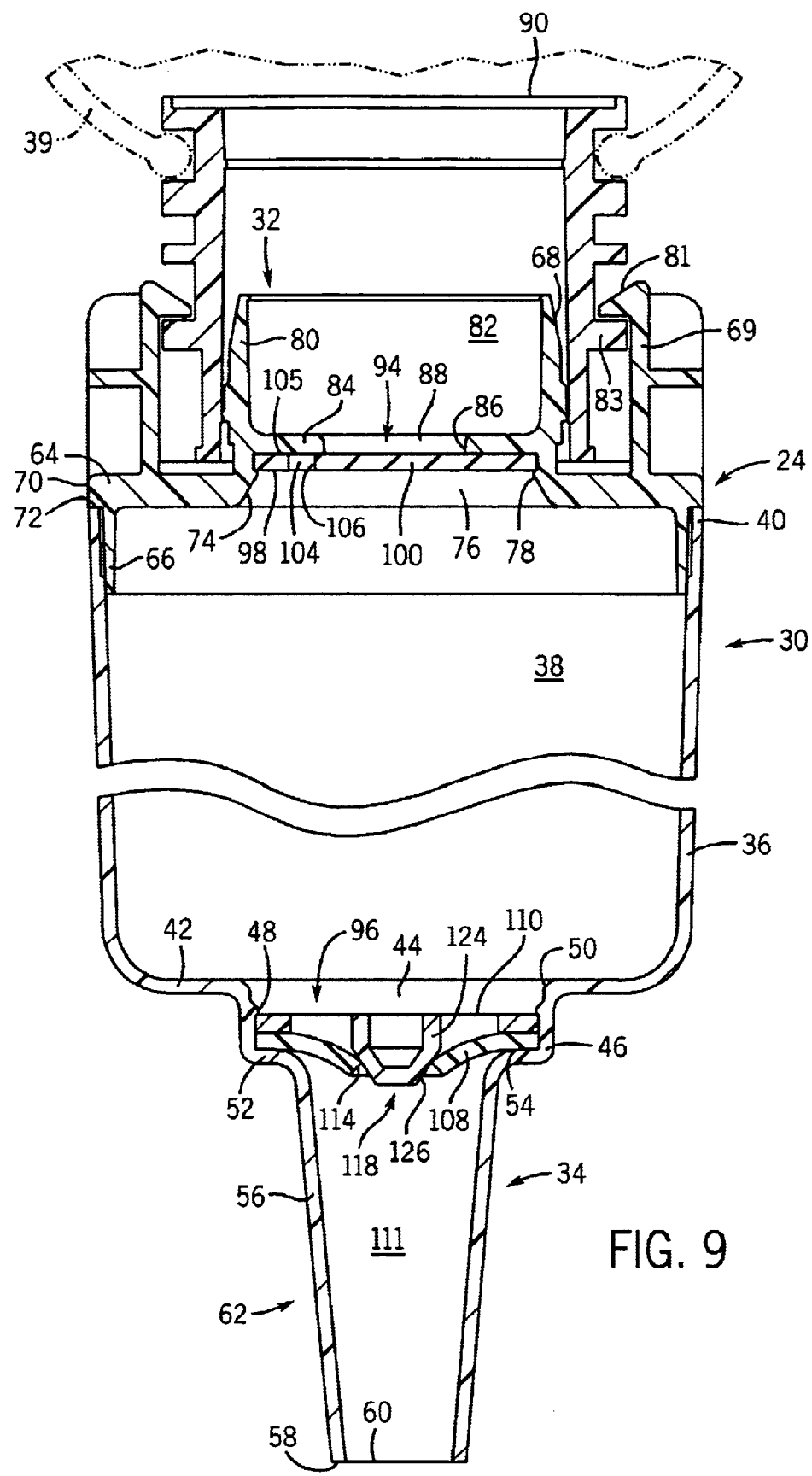
FIG. 9 is a section view of the disposable pump of the present invention.

As can be seen in FIG. 9, the portioning chamber 30 includes a cylindrical outer wall 36 that defines an open interior 38. The open interior 38 of the portioning chamber has a known volume that receives the supply of food product from a flexible product container 39 as show in broken lines. The outer wall 36 defines a circular top lip 40, as illustrated in FIG. 8. As shown in FIG. 9, the outer wall 36 is curved inward to define the bottom wall 42. The bottom wall 42 defines a circular, central opening 44. The central opening 44 extends downward and is defined by a cylindrical lower sidewall 46. The lower sidewall 46 includes a retaining notch 48 formed along its inner surface 50. The retaining notch 48 extends along the entire inner surface of the sidewall 46 to form a notch along the entire inner surface 50.

As illustrated in FIG. 9, the lower sidewall 46 is integrally formed with a transition wall 52 that extends toward the center of the central opening 44. The transition wall 52 forms an internal shoulder 54 at the transition between the portioning chamber 30 and the dispensing portion 34. As can be understood in FIG. 9, the portioning chamber 30 and dispensing portion 34 are integrally formed. In the preferred embodiment of the invention, the combination of the dispensing portion 34 and the portioning chamber 30 are formed form a low density polyethylene.

The transition wall 52 is connected to a tapered outer wall 56. The tapered outer wall 56 terminates at the bottom lip 58 to define a dispensing opening 60. As illustrated in FIG. 9, the tapered outer wall 56 defines the spout 62 that provides a controlled flow of food product from the disposable pump 24.

Referring back to FIG. 8, the disposable pump 24 includes the attachment portion 32 secured to the top lip 40 of the portioning chamber 30. The attachment portion 32 generally includes a circular top wall 64, a depending attachment flange 66, a protruding attachment fitting 68 and a pair of locking fingers 69. Referring back to FIG. 9, the top wall 64 extends radially outward to define the outer edge 70. The diameter of the outer edge 70 is generally equal to the outer diameter of the top lip 40 to form a smooth transition from the portioning chamber 30 to the attachment portion 32. Specifically, the top wall 64 includes the depending attachment flange 66. The outer diameter of the attachment flange 66 is less than the outer diameter of the outer edge 70, such that a shoulder 72 is formed along the bottom surface of the top wall 64. The shoulder 72 contacts the top lip 40. In the preferred embodiment of the invention, the top lip 40 and the attachment flange 66 are spun welded together to form the disposable pump 24 of the present invention. However, it is contemplated that other methods of attaching the attachment portion 32 to the portioning chamber 30 are within the scope of the present invention.

Referring back to FIG. 9, the top wall 64 terminates at an inner edge 74. The inner edge 74 defines the central opening 76. The inner edge 74 is tapered inwardly and includes a protruding lip 78 that extends along the entire inner surface of the central opening 76.

The attachment fitting 68 generally includes a cylindrical outer wall 80 joined to the top wall 64. The outer wall 80 defines an open interior 82 that is in fluid communication with the open interior 38 of the portioning chamber 30. The open interior 82 is defined at its lower end by an internally extending flange 84. The internally extending flange 84 includes an inner edge 86 that defines an opening 88. The opening 88 is in fluid communication with the central opening 76 such that food product can flow from the attachment portion 32 into the portioning chamber 30.

As can be seen in FIGS. 8 and 9, the attachment portion 32 includes a pair of spaced locking fingers 69 that each extend from the top wall 64. The locking fingers 69 each include a locking tab 81 that engages a rib 83 extending from a coupling device or fitment 90 contained on the flexible product package 39. As illustrated in broken lines in FIG. 9, the product package 39 includes the coupling device 90 welded to the pouch defining the product package 39. The attachment portion 32, and specifically the attachment fitting 68, is securely received within the coupling device 90 to provide a path for food product to flow from the interior of the product package into the open interior 82, and eventually into the open interior 38 of the portioning chamber 30.

Referring back to FIG. 8, the disposable pump 24 includes an inlet valve 94 and a two-piece outlet valve 96. The inlet valve 94 is positioned between the attachment portion 32 and the portioning chamber 30, while the outlet valve 96 is positioned between the portioning chamber 30 and the dispensing portion 34.

The inlet valve 94 is formed from a resilient material and includes an outer sealing ring 98 and a deflectable flap 100. The flap 100 is joined to the sealing ring 98 by a flexible connecting section 102. The remaining portions of the flap 100 are spaced from the sealing ring 98 by an air gap 104. The connecting section 102 allows the flap 100 to move upward and downward relative to the sealing ring 98, as will be described in detail below.

Referring now to FIG. 9, the inlet valve 94 is installed in the attachment portion 32 by pressing the inlet valve 94 through the central opening 76. As can be seen in FIG. 9, the sealing ring 98 is entrapped between the lip 78 and a sealing face surface 105 formed on the inwardly extending flange 84. The flap 100 is sized such that the outer edge 106 of the flap 100 contacts the sealing face surface 105. Thus, the flange 84 prevents the flap 100 from deflecting upward into the open interior 82, while allowing the flap 100 to deflect downward into the open interior 38 of the portioning chamber 30. In this manner, the inlet valve 94 serves as a one-way valve allowing the flow of food product into the portioning chamber 30 from the attachment portion 32 while preventing the reverse flow, as will be described in detail below.

The inlet valve 94, and specifically the method of attachment of the flap 100 to the scaling ring 98, allows food product including entrained particles to easily flow into the open interior 38 of the portioning chamber 30. This is particularly important when pumping food product such as cheese including chopped peppers or other added material.

Referring now to FIG. 8, the outlet valve 96 generally includes a flex washer 108 and a cone washer 110 that combine to act as a one-way valve allowing the flow of food product from the portioning chamber 30 into the dispensing portion 34, and specifically the open interior 111 of the spout 62 as shown in FIG. 9. The flex washer 108 is formed from a resilient elastic material and includes a central opening 112. The central opening 112 is defined by an edge surface 114, as shown in FIG. 9.

The cone washer 110 includes an outer ring 116 that defines an open interior in which a center plug 118 is supported by a series of spokes or bridges 120. The spokes define a series of access openings 122 that allow the food product to flow through the cone washer 110.

Referring again to FIG. 9, the flex washer 108 and cone washer 110 are positioned at the intersection between the portioning chamber 30 and the dispensing portion 34 by pressing the two washers 108 and 110 into a seat formed between the retaining notch 48 and the transition wall 52. The press fit of the outlet valve 96 into the disposable pump 24 allows the outlet valve 96 to be installed without using any external equipment or adhesive compounds.

The plug 118 is formed from an outer wall 124 having a tapered outer surface 126 that is received within the central opening of the flex washer 108. As illustrated in FIG. 9, the outlet valve 96, and specifically the flex washer 108, prevent the flow of food product back into the portioning chamber 30 from the dispensing portion 34, and specifically the spout 62. However, the flex washer 108 flexes downward to allow food product to flow from the portioning chamber 30 to the spout 62.

Figures 10, 11:
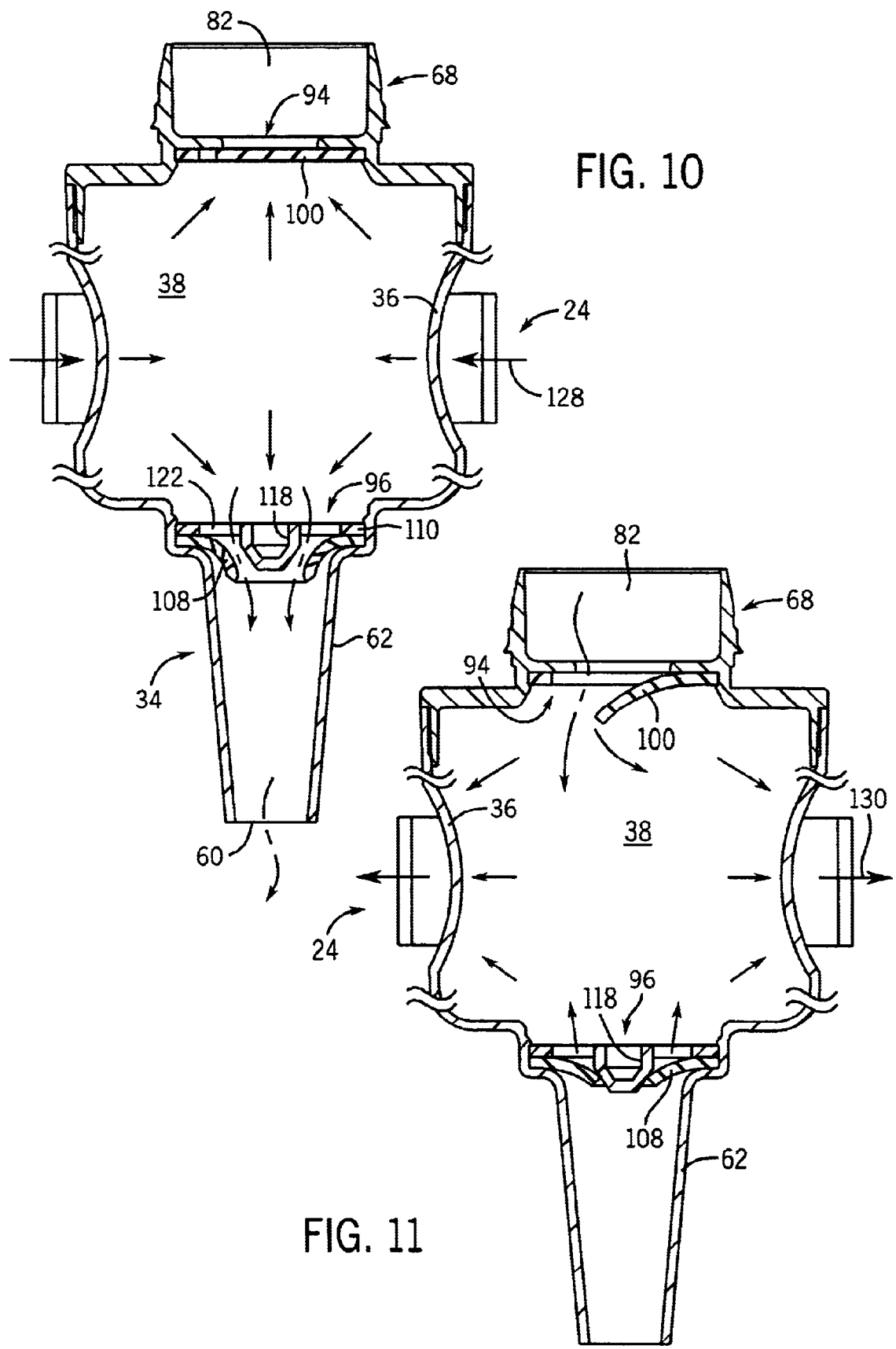
FIG. 10 is a section view of the disposable pump illustrating the flow of food product into the disposable pump as the pump is compressed.
FIG. 11 is a section view similar to FIG. 10 illustrating the flow of food product upon movement of the disposable pump from the compressed condition to the filling condition.

Referring now to FIGS. 10 and 11, thereshown is the actual operation of the disposable pump 24. In FIG. 10, the outer wall 36 of the portioning chamber 30 is compressed, as illustrated by arrow 128. In the preferred embodiment of the invention, the outer wall 36 is compressed using a mechanical device to be described in detail below. However, it should be understood that any type of compression of the outer wall 36 will function to operate the disposable pump 24 in the manner to be described.

As the outer wall 36 is compressed, the size of the open interior 38 decreases. When food product is contained within the open interior 38, the food product is then forced out of the open interior 38 through the outlet valve 96. Specifically, the flow of food product pushes the flex washer 108 downward, which allows the food product to flow through the series of access openings 122 formed in the cone washer 110. The food product flows around the center plug 118 and into the spout 62 formed in the dispensing portion 34. As the food product flows into the spout 62, food product is forced out the dispensing opening 60 for application to a food product. As can be understood in FIG. 10, when the outer wall 36 is being compressed, the inlet valve 94, and specifically the flap 100, prevents the flow of food product into the open interior 82 of the attachment fitting 68.

After the outer wall has been compressed, the compressing force is released and the resilient nature of the outer wall 36 causes the outer wall to return to its normal, filling condition, as illustrated by arrows 130. As the volume of the open interior 38 begins to increase, food product is drawn into the open interior 30 from the food package. Specifically, food product flows into the open interior 82 of the attachment fitting 68 and causes the flap 100 of the inlet valve 94 to deflect downward and allow food product to flow into the open interior 38. At the same time, the flex washer 108 of the outlet valve 96 contacts the center plug 118 to prevent the flow of food product from within the spout to flow into the open interior 38.

As can be understood by the above description, the combination of the inlet valve 94 and the outlet valve 96 control the direction of flow of food product within the disposable pump 24. Additionally, the ease of installation of the inlet valve 94 and the outlet valve 96 allow the disposable pump 24 to be molded as two separate components that are spun welded together after the inlet valve 94 and the outlet valves 96 have been installed. In this manner, the entire disposable pump 24, including the inlet valve 94 and the outlet valve 96, can be manufactured for very low cost such that the pump 24 can be disposed of along with the flexible food package.

As can be understood by the previous description, the disposable pump 24 is operated by compressing the outer wall of the pump to force food product through the outlet valve and out of the dispensing opening 60. FIGS. 2–7 illustrate a preferred mechanical method of providing the compression force required to utilize the disposable pump 24 previously described.

Figure 4:
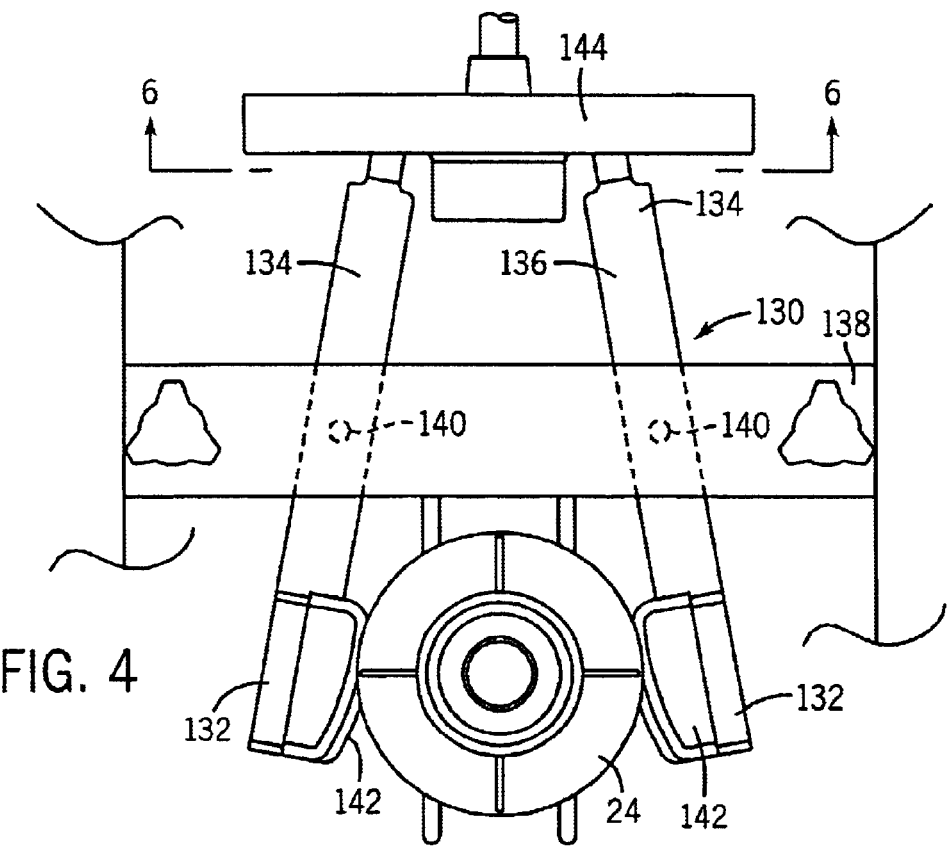
FIG. 4 is a top view of the disposable pump and drive mechanism in the filling position.

Referring first to FIG. 2, the means for compressing the disposable pump 24 in accordance with the preferred embodiment of the invention includes a pair of actuating arms 130 that are positioned on opposite sides of the pump 24. As can be seen in FIG. 4, each of the actuating arms 130 extends between an outer end 132 and an inner end 134. The body 136 of each arm 130 is pivotally connected to a support bracket 138 about a pivot point 140. The pivot point 140 is positioned between the outer end 132 and the inner end 134.

Figure 5:
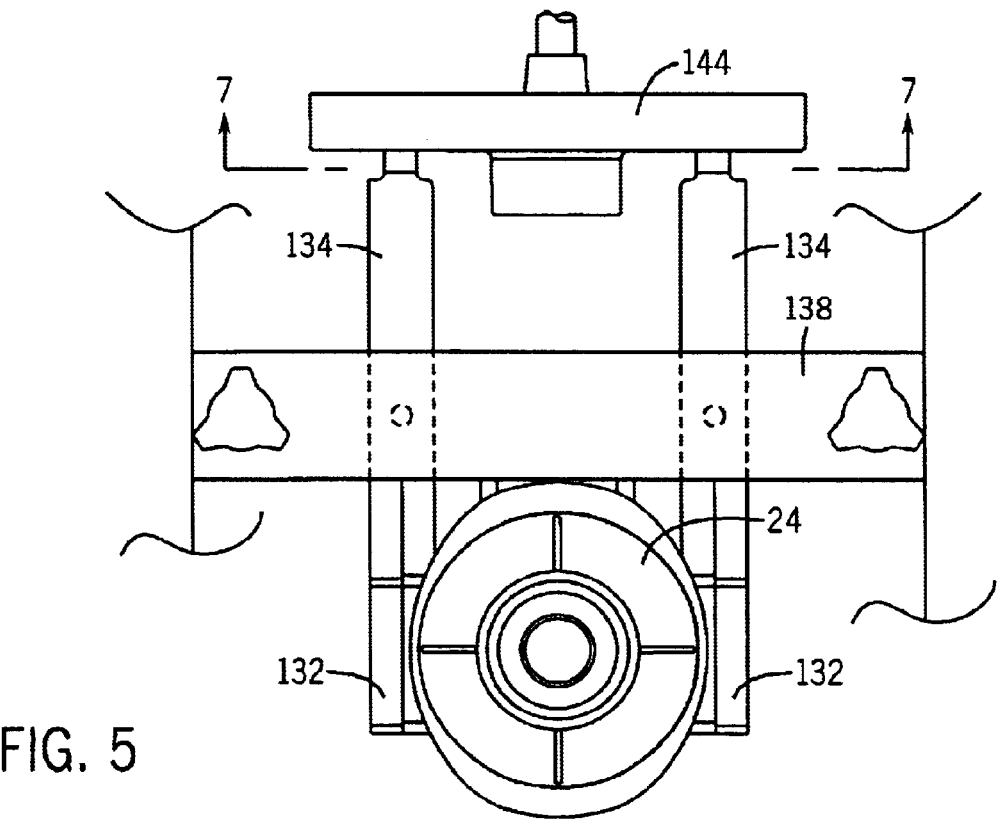
FIG. 5 is a top view similar to FIG. 4 illustrating the operation of the drive mechanism to compress the disposable pump and dispense food product.

As can be understood in FIGS. 4 and 5, when the inner ends 134 of the pair of actuating arms 130 are moved closer together, the outer ends 132 move further apart. Likewise, when the inner ends 134 are moved further apart (FIG. 5), the outer ends 132 move closer together. Thus, by moving the inner ends 134 of the actuating arms 130 toward and away from each other, the actuating arms 130 compress the disposable pump 24 and allow the disposable pump to return to its filling position.

As can be seen in FIGS. 2 and 4, the outer end 132 of each actuating arm 130 includes a pad 142 that contacts the outer wall of the disposable pump 24. Each pad 142 is configured to exert even pressure along the outer wall of the disposable pump 24 to prevent puncture of the pump and supply smooth discharge of the food product from the disposable pump.

Figure 3:
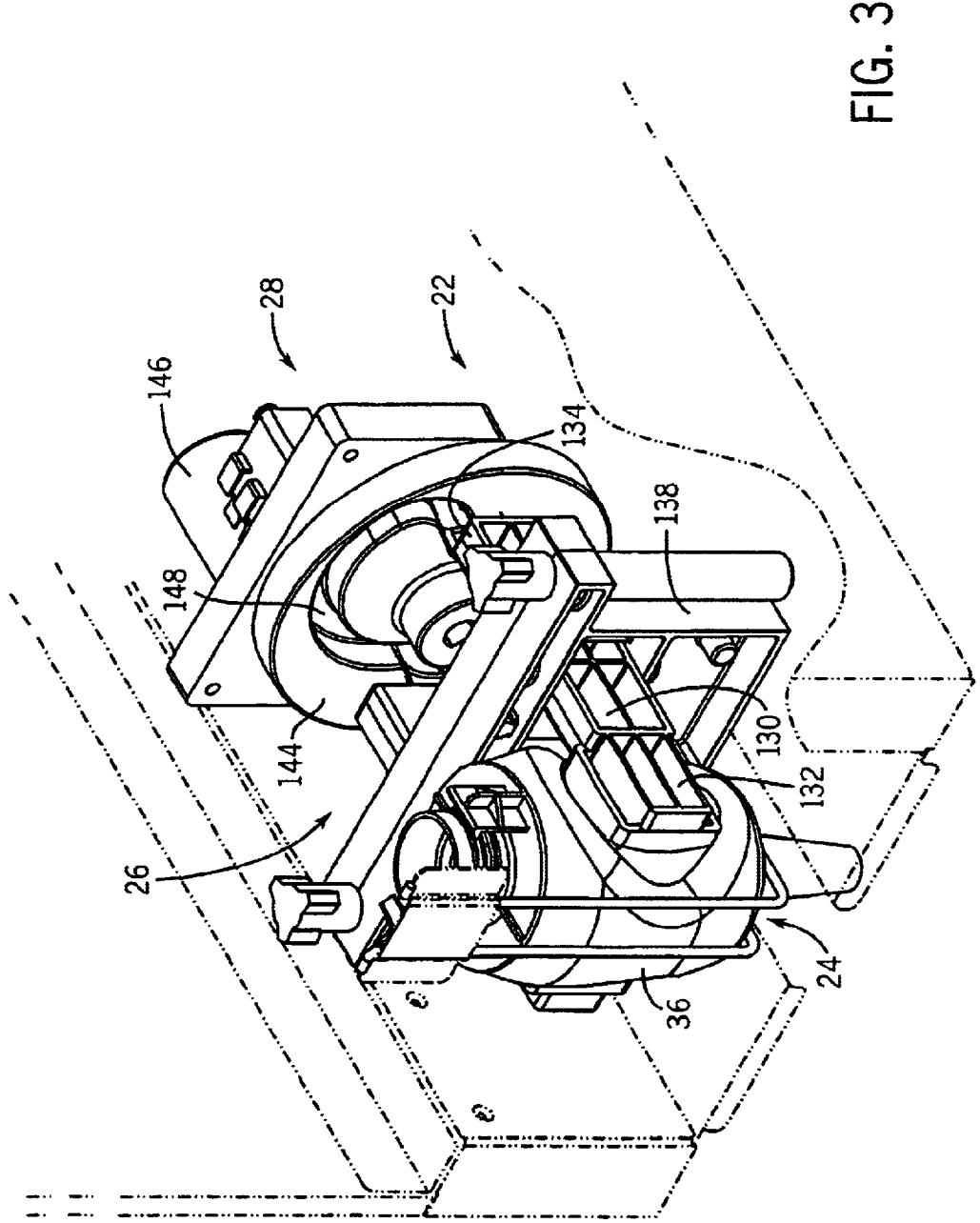
FIG. 3 is a perspective view similar to FIG. 2, illustrating the operation of the drive mechanism to compress the disposable pump to dispense food product.

As can be seen in FIGS. 2 and 3, the movement of the inner ends 134 of the actuating arms 130 toward and away from each other are controlled by a cam plate 144 rotatably connected to a drive motor 146. The cam plate 144 includes a recessed drive track that is sized to receive a pin 150 formed on the inner end 134 of each actuating arm 130. As can be understood in FIGS. 2 and 3, the drive motor 146 can be operated to rotate the cam plate 144 such that the drive track 148 moves the inner ends 134 from their closest position (FIG. 2) to their furthest apart position (FIG. 3), thus causing the outer ends 132 to compress the disposable pump 24.

Figure 6:
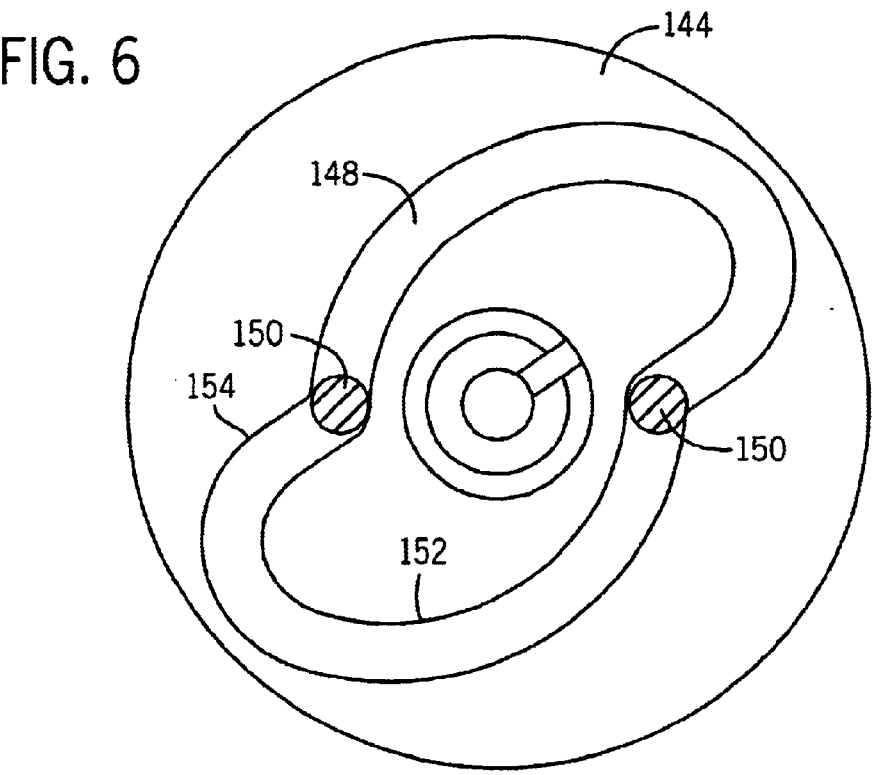
FIG. 6 is a view taken along line 6-6 of FIG. 4 illustrating the configuration of the rotating drive plate of the drive mechanism when the drive mechanism is in the filling position.
Figure 7:
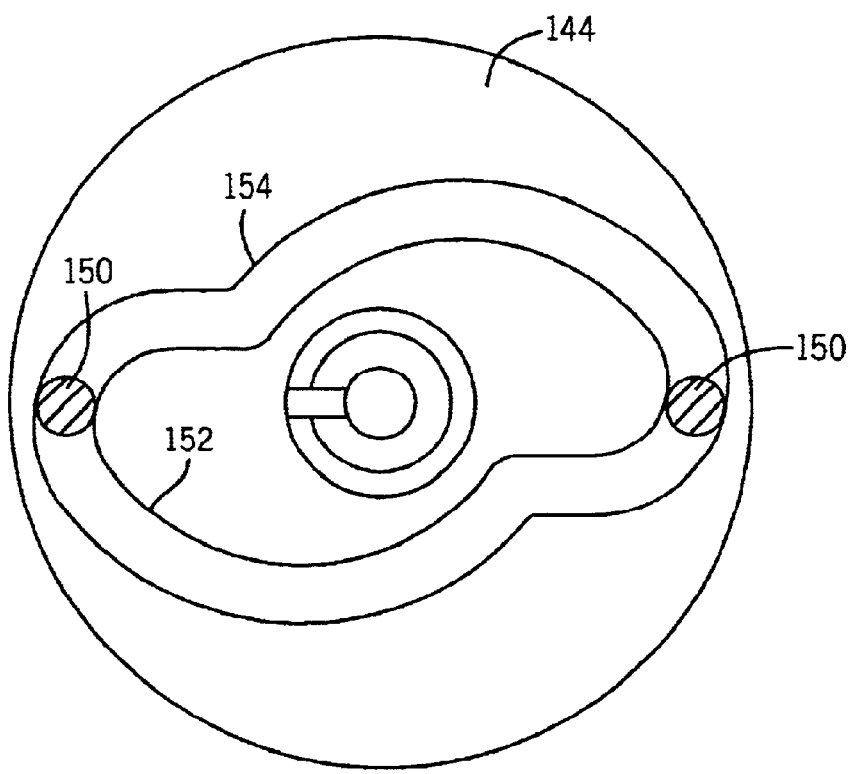
FIG. 7 is a view taken along line 7-7 of FIG. 5 illustrating the drive plate in its compressed position used to expel food product from the disposable pump.

Referring now to FIGS. 6 and 7, thereshown is a front view of the cam plate 144 of the present invention. The cam plate 144 includes the recessed drive track 148 that is defined by an inner cam surface 152 and an outer cam surface 154. The pin 150 formed on the inner end of each actuating arm 130 is received within the drive track 148. In the position illustrated in FIG. 6, the pins 150 are positioned at their closest. During this condition, the outer ends of the actuation arms are separated far enough that they do not compress the disposable pump 24, as shown in FIG. 2. In this filling position, the disposable pump 24 is full of food product from the attached product container.

Upon depressing the button 20 (FIG. 1) on the front face of the food warmer and dispenser 10, the drive motor 146 rotates, which causes the cam plate 144 to rotate 90° to the position shown in FIG. 7. In FIG. 7, the pins 150 have been guided by the inner cam surface 152 and the outer cam surface 154 into their furthest apart position. In this position, the outer ends 132 of the actuating arms 130 are moved toward each other into a compressing position, as shown in FIG. 3. As the outer ends 132 move toward each other, the outer wall of the disposable pump 24 is compressed, which causes food product to be forced from the disposable pump.

After the food product has been dispensed, the cam plate 144 rotates another 90° such that the pins 150 return to their closest position, as illustrated in FIG. 6. Once again, the outer ends 132 of the actuating arms 130 move away from each other, which allows the outer wall of the resilient disposable pump to expand and draw food product into the portioning chamber.

As can be understood by the above comments, it is important that the material chosen to form the disposable pump 24 be sufficiently resilient such that when the actuating arms are moved to the filling position, the outer wall of the disposable pump creates enough negative pressure to draw food product into the disposable pump through the inlet valve. As discussed previously, in the preferred embodiment of the invention, the disposable pump is formed from polyethylene that is sufficiently resilient to return to its filling condition.

Referring now to FIGS. 2 and 3, as the actuating arms 130 move from the filling position shown in FIG. 2 to the compressing position shown in FIG. 3, the amount of food product dispensed from the disposable pump 24 depends upon the distance between the outer ends 132 of the actuating arms 130 at the fully compressed position. As, can be understood, the closer the outer ends 132 are to each other, the more of the food product from the disposable pump is squeezed out of the dispensing opening. Therefore, the distance between the pivot points 140 can be varied, or the design of the drive track 148 can be modified to increase or decrease the amount of food product dispensed during each cycle. In the preferred embodiment of the invention, the disposable pump 24 and the actuating arms 130 are configured such that approximately one ounce of food product is dispensed per actuation cycle. In this manner, the dispensing assembly 22 can accurately meter a known amount of food product by the user simply depressing the actuation button 20.

Figure 12:
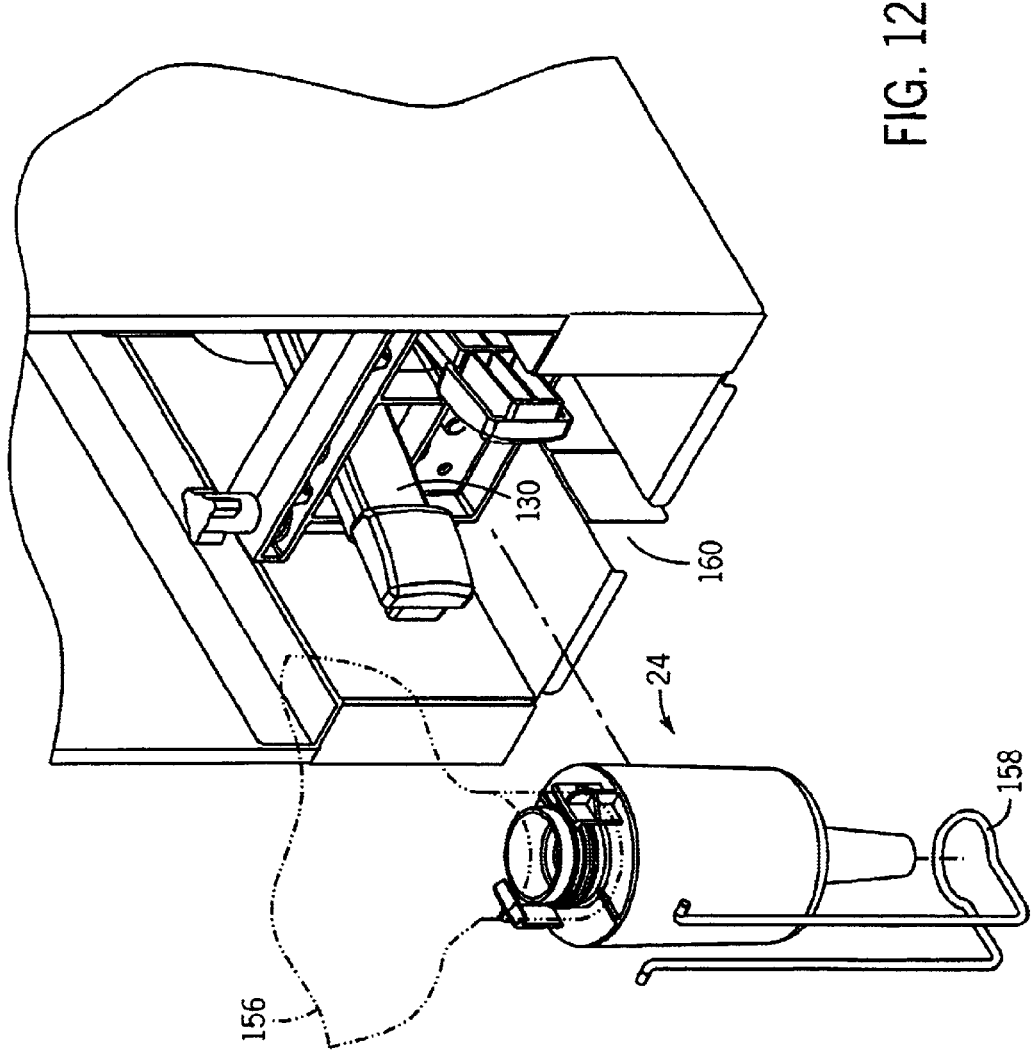
FIG. 12 is a perspective view illustrating the removal and replacement of the disposable pump from the drive mechanism.

Referring now to FIG. 12, thereshown is the insertion and removal of the disposable pump 24 and attached product container 156 into the interior of the food warmer and dispenser. As illustrated, a support bracket 158 is positioned having a U-shaped opening 160 that allows the pump 24 to slide into and out of the support structure. When the pump 24 and product container 156 are removed, the outer ends 132 of the actuating arms 130 are in their furthest apart, filling position. The pump 24 and product container can then be slid into the support bracket 58. The product container 156 is supported above the dispensing assembly and can be removed once the food product has been completely removed.

In the embodiment of the invention illustrated, the heating mechanism (not shown) contained within the upper enclosure 16 operates to not only heat the food product when it is in the product container, but also to heat the food product when it is contained within the disposable pump 24. Therefore, if the food warmer and dispenser is not used for and extended period of time, the food product contained within the disposable pump 24 remains near the desired dispensing temperature.

Various alternatives and embodiments are contemplated as being within the scope of the following claims particularly pointing out and distinctly claiming the subject matter regarded as the invention.

We claim:

1. An assembly for dispensing liquid food product from a self-contained flexible container having an integrated coupling device, the assembly comprising:

a disposable pump configured for connection to the coupling device of the flexible container, the pump having an open portioning chamber for receiving the food product, an attachment fitting configured for engagement with the coupling device of the flexible container, and a dispensing portion in fluid communication with the portioning chamber for dispensing the liquid food product from the disposable pump; and means for compressing the portioning chamber of the disposable pump, the means for compressing being positioned to contact a resilient outer wall of the portioning chamber to compress the portioning chamber, wherein the means for compressing the portioning chamber of the disposable pump includes a pair of members movable toward each other to compress the portioning chamber of the disposable pump.

2. The assembly of claim 1 further comprising a drive member being coupled to the means for compressing the disposable pump, the drive member being operable to cause the means for compressing to move between a compressing position and a filling position.

3. The assembly of claim 1 wherein the disposable pump further comprises:

an inlet valve positioned between the attachment fitting and the portioning chamber, wherein the inlet valve prevents movement of food product from the portioning chamber into the attachment portion during compression of the portioning chamber; and an outlet valve positioned between the portioning device and the dispensing portion, wherein the outlet valve prevents movement of the food product back into the portioning chamber from the dispensing portion as the portioning chamber expands from the compressed condition.

4. The assembly of claim 1 wherein the assembly includes an activation button to activate the means for compressing the disposable pump, the means for compressing to move from the filling position to the compressing position upon compression of the actuation button.

5. An assembly for dispensing liquid food product from a self-contained flexible container having an integrated coupling device, the assembly comprising:

a disposable pump configured for connection to the coupling device of the flexible container, the pump having an attachment fitting configured for engagement with the coupling device of the flexible container, the pump being operable to dispense the liquid food product from the disposable pump; and means for compressing the disposable pump to dispose the liquid food product from the pump;

wherein the pump is disposed of after the flexible container has been evacuated, and wherein the means for compressing the disposable pump includes a pair of members movable toward each other to compress the pump.

6. The assembly of claim 5 further comprising a drive member coupled to the means for compressing the disposable pump, the drive member being operable to cause the means for compressing to move between a compressing position and a filling position.

7. The assembly of claim 5 wherein the pump includes at least one locking member positioned to engage the coupling device and retain the pump with the coupling device.

8. An assembly for dispensing liquid food product from a self-contained flexible container having an integrated coupling device, the assembly comprising:

a disposable pump configured for connection to the coupling device of the flexible container, the pump having an open portioning chamber defined by a resilient outer wall, the portioning chamber being positioned between an attachment portion and a dispensing portion of the disposable pump;

a compressing device positioned to contact the outer wall of the pump, the compressing device being movable between a compressing position and a filling position wherein movement of the compressing device to the compressing position compresses the portioning chamber and forces the liquid food product within the portioning chamber out of the dispensing portion of the disposable pump; and a drive member coupled to the compressing device, the drive member being operable to move the compressing device between the compressing position and the filling position, wherein the compressing device includes a pair of actuating arms each extending between an outer end and an inner end, the disposable pump being positioned between the outer ends of the actuating arms, the outer ends of each actuating arm being movable toward each other to compress the portioning chamber of the disposable pump.

9. The assembly of claim 8 wherein each actuating arm is pivotable about a pivot axis positioned between the inner end and the outer end of the actuating arm, wherein the drive member engages the inner ends of each arm to move the inner ends of the arms toward and away from each other, wherein movement of the inner ends of the actuating arms away from each other causes the outer ends of the actuating arms to compress the portioning chamber of the disposable pump.

10. The assembly of claim 9 wherein the drive member includes a cam plate rotatably connected to a drive motor, wherein rotation of the cam plate moves the inner ends of the actuating arms toward and away from each other.

11. The assembly of claim 10 wherein the cam plate includes a drive track that receives the inner ends of each actuating arm such that the drive track moves the inner ends of the actuating arms toward and away from each other as the cam plate rotates.

12. The assembly of claim 11 wherein the drive track is configured such that 180° of rotation of the cam plate moves the outer ends of the arms from the compressing position to the filling position.

13. The assembly of claim 12 wherein the inner end of each arm includes a pin, the pin being received in the drive track.

14. The assembly of claim 13 wherein the drive track is recessed into the cam plate and includes an inner cam surface and an outer cam surface, the inner cam surface and the outer cam surfaces being configured to contact the pins to move the inner ends of the actuating arms toward and away from each other as the cam plate rotates.

15. The assembly of claim 8 wherein the disposable pump further comprises:
an inlet valve positioned between the attachment portion and the portioning chamber, wherein the inlet valve prevents movement of food product from the portioning chamber into the attachment portion during compression of the portioning chamber; and an outlet valve positioned between the portioning chamber and the dispensing portion, wherein the outlet valve prevents movement of the food product back into the portioning chamber from the dispensing portion as the portioning chamber expands from the compressed condition.

16. The assembly of claim 15 wherein the inlet valve includes an outer sealing ring that defines an annular opening through which food product can pass, the inlet valve further including a deflectable flap attached to the sealing ring, wherein the flap contacts an annular seat formed in the attachment portion to prevent the flap from opening into the attachment portion.

17. The assembly of claim 15 wherein the outlet valve comprises:
a flex washer having a central opening, the flex washer being positioned in contact with a seat formed in the dispensing portion; and
a cone washer positioned in contact with the flex washer, the cone washer having a center plug positioned to block the central opening of the flex washer, wherein the flex washer is deflectable away from the center plug of the cone washer to allow food product to pass from the portioning chamber into the dispensing portion and wherein the flex washer contacts the center plug of the cone washer to prevent the flow of food product back into the portioning chamber from the dispensing portion.

18. The assembly of claim 8 wherein the dispensing portion and the portioning chamber are integrally formed from plastic.

19. The assembly of claim 18 wherein the attachment portion is formed separate from the portioning chamber and is secured to the outer wall of the portioning chamber.

20. The assembly of claim 19 wherein the attachment portion includes at least one flexible locking finger adapted to engage the coupling device of the flexible container.

21. The assembly of claim 17 wherein the cone washer includes an outer ring that defines a central opening, the center plug being suspended in the central opening by a plurality of bridges.

22. A disposable pump for use in dispensing a liquid food product from a flexible container including the liquid food product, the flexible container including a coupling device, the disposable pump comprising:
an open portioning chamber configured to receive the food product from the flexible container, the portioning chamber being defined by a resilient outer wall;
an attachment portion in fluid communication with the portioning chamber, the attachment portion including an external attachment fitting for engagement with the coupling device of the flexible container, the attachment fitting including an open interior configured to allow food product to flow into the portioning chamber from the flexible container;
a dispensing portion in fluid communication with the portioning chamber, the dispensing portion being formed integrally with the portioning chamber;
an inlet valve positioned between the attachment fitting and the portioning chamber, wherein the inlet valve prevents movement of food product from the portioning chamber into the attachment portion during compression of the portioning chamber; and
a flexible washer having a central opening, the flexible washer being positioned in contact with a seat formed in the dispensing portion;
a cone washer positioned between the portioning chamber and the flex washer, the cone washer having a center plug positioned to cover the central opening of the flexible washer,
wherein the flex washer is deflectable away from the center plug of the cone washer to allow food product to pass from the portioning chamber into the dispensing portion and the flex washer contacts the center plug of the cone washer to prevent the flow of food product back into the portioning chamber from the dispensing portion, and
wherein the cone washer includes an outer ring that defines a central opening, the center plug being suspended in the central opening by a plurality of bridges.

23. The disposable pump of claim 22 wherein the inlet valve includes an outer sealing ring that defines an annular opening through which food product can pass from the attachment fitting to the portioning chamber, the inlet valve further including a deflectable flap attached to the sealing ring and centered within the annular opening, wherein the deflectable flap contacts an annular seat formed in the attachment portion to prevent the flap from opening into the attachment portion.

* * * * *